United States Patent
Nakamura et al.

[11] Patent Number: 5,917,168
[45] Date of Patent: *Jun. 29, 1999

[54] SYSTEM AND METHOD FOR REVALUATION OF STORED TOKENS IN IC CARDS

[75] Inventors: Lance S. Nakamura, Pearl City, Hi.; Alan B. Roberts, Boulder, Colo.; John F. Sheets, Paris, France

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/578,718
[22] PCT Filed: Jun. 2, 1994
[86] PCT No.: PCT/US94/06031
  § 371 Date: Apr. 18, 1996
  § 102(e) Date: Apr. 18, 1996
[87] PCT Pub. No.: WO94/28498
  PCT Pub. Date: Dec. 8, 1994

Related U.S. Application Data

[63] Continuation-in-part of application No. 08/071,283, Jun. 2, 1993, abandoned.

[51] Int. Cl.$^6$ .................................................. G06F 15/30
[52] U.S. Cl. ........................................... 235/379; 902/22
[58] Field of Search ..................................... 235/379, 380, 235/381, 382; 902/22

[56] References Cited

U.S. PATENT DOCUMENTS

| | | | |
|---|---|---|---|
| 4,845,347 | 7/1989 | McCrindle et al. | 235/380 |
| 5,361,062 | 11/1994 | Weiss et al. | 235/382 |
| 5,438,184 | 8/1995 | Roberts et al. | 902/22 |
| 5,484,519 | 1/1996 | Weiss | 235/380 |

Primary Examiner—Donald Hajec
Assistant Examiner—Karl D. Frech
Attorney, Agent, or Firm—Lowell C. Bergstedt

[57] ABSTRACT

A terminal for carrying out at a private location a transaction consisting of alteration of a token value stored in an IC card issued to a cardholder via an on-line transaction session with an operatively compatible terminal at a remote location. The private terminal establishes data links with the IC card and the remote terminal and passes secure authentication and transaction messages between them via these data links, relying on the IC card and the remote terminal for message security.

9 Claims, 8 Drawing Sheets

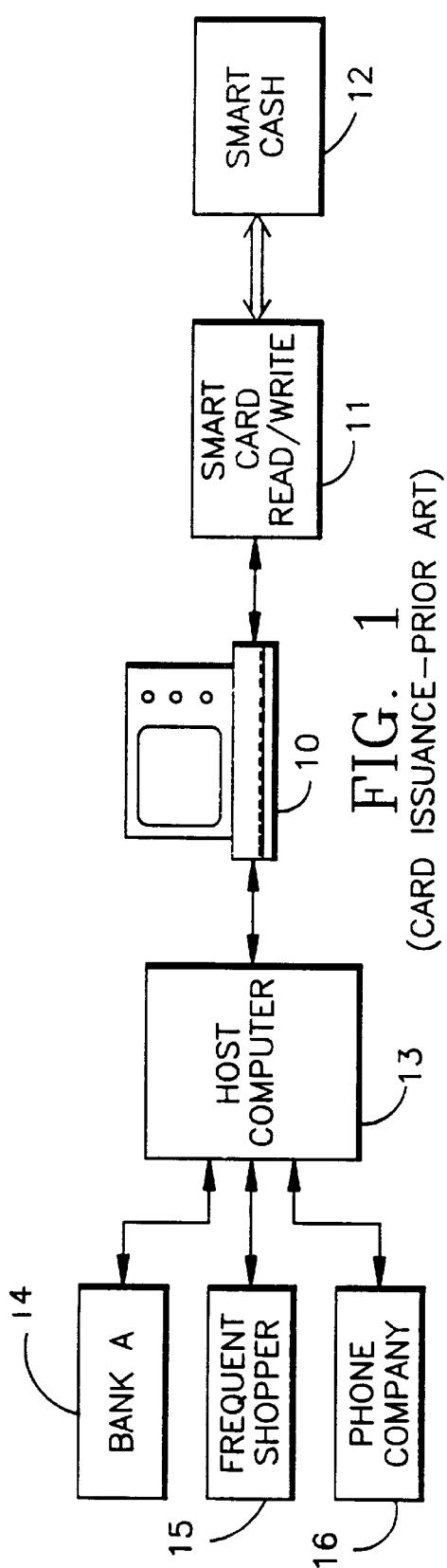
FIG. 1 (CARD ISSUANCE—PRIOR ART)
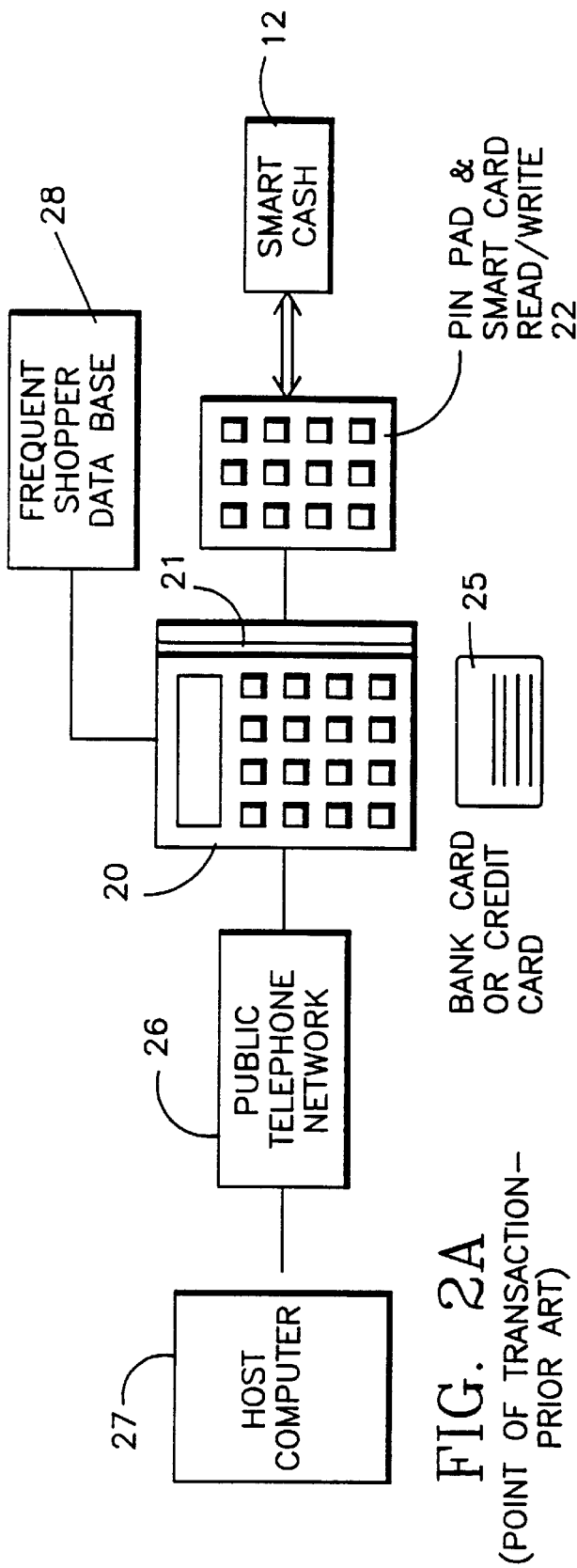
FIG. 2A (POINT OF TRANSACTION—PRIOR ART)

(PHONE USAGE—PRIOR ART)

SYSTEM AND METHOD FOR REVALUATION OF STORED TOKENS IN IC CARDS

This application is a Continuation-in-Part of application Ser. No. 08/071,283, filed Jun. 2, 1993, now abandoned.

BACKGROUND OF THE INVENTION

This invention relates generally to systems and methods for performing on-line revaluation of token information (such as "electronic cash" or "service usage credits" e.g. phone usage credits) stored in IC cards, also called smart cards, and more particularly to systems and methods for performing such revaluation in a private location.

One of the well-known uses of IC cards involves storing token information for the cardholder to utilize in carrying out a cashless transaction. IC cards and associated transaction terminals used for this purpose have utilized increasingly sophisticated security schemes to prevent unauthorized card manufacture, unauthorized card issuance, or fraudulent card use. See, for example, Nakano U.S. Pat. Nos. 4,810,862 and 4,839,504 for descriptions of security features introduced during manufacture and issuance of an IC card and thereafter employed during use to authenticate the card and the cardholder.

Some commercial applications involve issuance of an IC card with an initial token value and card logic or programming which only permits decrementing the stored token value until completely exhausted, after which the card is discarded and a new card must be purchased.

Other commercial applications involve issuance of an IC card which has an initial token value and card logic or programming which permits revaluation, i.e. incrementing token value in addition to decrementing. These applications have become known generally as the "electronic purse."

In some electronic purse applications, the IC card may only be revalued at a secure revaluation station, e.g. a sophisticated automated teller machine (see above-referenced Nakano '504 patent) or a special funds transfer terminal on line with a sophisticated host computer (see Mansvelt U.S. Pat. No. 5,175,416). These secure revalue stations are capable of full utilization of card and terminal security features and are typically maintained in secure environments to prevent fraudulent use and to preclude unauthorized access for sophisticated probing of security features which might thereafter be used to clone revaluation stations as part of fraudulent card issuance or revaluation schemes.

One of the limitations of electronic purse usage of IC cards is that the cardholder is unable to readily determine the remaining cash token value stored in the card until presenting it for use in consummating a transaction. If the stored cash token value is insufficient to cover the purchase amount, the cardholder must void the transaction or use some other form of payment. Another limitation is that the cardholder must typically visit a special terminal location for adding cash token value to the card, rendering the convenience level of the electronic purse application essentially the same as actual cash (i.e. government issued scrip) withdrawal at an ATM.

The desirability of permitting revaluation of an electronic purse IC card at a private location such as home or office is generally recognized in Ugon U.S. Pat. No. 4,656,342. This '342 patent also generally recognizes the desirability of incorporating a plurality of tokens in an electronic purse IC card with each token being associated with a particular service provided by an authorizing entity. In addition to a stored cash token value which can generally be used to purchase goods and services at locations having authorized electronic purse transaction terminals, the electronic purse may, for example, also have a telephone usage token value which may be used in public telephones having authorized IC card interface devices.

The electronic purse revaluation process described in the Ugon '342 patent involves the combination of a voice based telephone call to a special operator to request the special operator to revalue the cash token amount or other authorized token amount in the cardholder's electronic purse IC card. The operator and cardholder then establish a phone data link between an IC card interface unit on the premises of the cardholder and an authorizing terminal at the operator's location and the operator is thus enabled to utilize the authorizing terminal and the cardholder's card interface unit to perform a special card and service authentication function which, if successfully carried out, results in the IC card itself writing a new token value into the associated token value memory location.

Objects of this Invention

It is a principal object of this invention to provide an improved system and method for revaluation, by a cardholder at a private location, of one or more token values stored on an IC card. It is another object of this invention to provide an improved private transaction terminal for performing transaction operations in connection with an IC card.

Features and Advantages of this Invention

One aspect of this invention features a method for carrying out at a private location an alteration of a token value stored in an IC card issued to a cardholder via an on-line transaction session with an operatively compatible terminal at a remote location. This method utilizes an IC card having a microcontroller and associated microcontroller program memory, security protected memory locations for token value data and card security data, a data communication interface, and prearranged card security programs stored in said program memory for managing security of cardholder access and security of terminal access to security protected memory locations for transaction related data reading and writing operations.

The operatively compatible terminal at the remote location includes a data communication interface and prearranged transaction security programs compatible with said prearranged card security programs.

It should be understood that the IC card may have only one token value stored, e.g. a cash token, or may be a multiple token value card. It should also be understood that the terms "IC card" and "smart card" are used interchangeably in describing this invention.

The method of this invention involves first establishing a card data link to said data communication interface in said IC card and then communicating a cardholder data security message to said IC card via said card data link to enable said card security programs to produce secure cardholder identification data. The method also involves establishing a terminal data link to an external terminal at a remote location and then communicating secure transaction messages between said IC card and said external terminal via said card data link and said terminal data link, including token change vector data from said cardholder, to enable said IC card and said external terminal to perform mutual authentication functions and to execute a secure token value change transaction;

After the transaction between the IC card and the remote terminal is completed, the method continues with reading a revised token value stored in said IC card via said card data link and then communicating said revised token value to said cardholder. By having all of the secure authentication and transaction message data items created in the IC card itself and simply passing these messages via a remote data link, the method of this invention enables remote revaluation of IC card tokens in a simplified manner and facilitates the use of simple and inexpensive hardware on the cardholder end of the transaction. Another aspect of this invention features a terminal for carrying out at a private location a transaction consisting of alteration of a token value stored in an IC card issued to a cardholder via an on-line transaction session with an operatively compatible terminal at a remote location. The IC card and operatively compatible terminal have the features discussed above.

The private terminal used by the cardholder comprises means for establishing a card data link to said data communication interface in said IC card and means for accepting cardholder entry of a security data item and for communicating said security data item to said IC card via said card data link to enable said card security programs to prepare and return cardholder and card authentication data items;

The private terminal further includes means for enabling said cardholder to initiate a token value change transaction including means for accepting cardholder entry of a token change vector and means responsive to said cardholder initiating a token change transaction for- establishing a terminal data link via a public switched telephone network to an external terminal at a remote location.

Another element of the private terminal is means for communicating a series of secure messages between said IC card and said external terminal via said card data link and said terminal data link. These messages include secure authentication messages to enable said IC card and said external terminal to execute respective terminal authentication and IC card authentication programs, and secure transaction messages, including said token change vector, to enable said IC card and said external terminal to execute a secure token value change transaction.

The private terminal also includes means for reading a revised token value stored in said IC card via said card data link and for communicating said revised token value to said cardholder. This means for communicating the revised token value may be an alphanumeric display or a printer or a computer generated voice readout.

The private terminal of this invention has the advantage of simplicity and low cost since the IC card and the remote terminal compose all secure messages and handle the programmed transaction activity with the private terminal acting principally as a message passing entity. This reduces the risk of fraud because the private terminal itself is incapable of interacting with the IC card to do any transaction activity. The private terminal does not have to be maintained in a secure environment and thus such terminals can be distributed for use in cardholders' homes and offices and other private locations.

The private terminal of this invention is also not dedicated to a particular cardholder and can thus be utilized by any cardholder holding a compatible IC card. Thus, while the private terminal could be made portable, it is unnecessary to do so. A single terminal in each office location can be used by a number of cardholders to read the value of the tokens on their cards and to revalue the tokens as desired using the facilities of the terminal.

By having remote terminal phone numbers and other banking data stored on the IC card, the private terminal can function essentially as a dumb communication terminal for other banking transactions as well as token revaluation on the IC card. Once the remote terminal and the IC card have exchanged account and other data on a secure basis, the remote terminal and the private terminal can interact with banking function messages provided by the remote terminal and selection of functions by the cardholder. The degree of intelligence provided in the private terminal for personal ATM type transactions is, of course, optional. For example, the private terminal may include elementary function keys for account balance inquiries, mini-statement inquiries, deposit and check payment inquiries and the like.

Other objects, features, and advantages of this invention will be apparent from the detailed description below of embodiments of the invention.

BRIEF DESCRIPTION OF DRAWING FIGURES

FIG. 1 is a basic system diagram showing elements of a prior art card issuing system useful in connection with this invention.

FIGS. 2A and 2B are a basic system diagrams showing elements of a prior art point of transaction systems useful in connection with this invention.

DETAILED DESCRIPTION OF INVENTION EMBODIMENTS

Card Issuance

Figure 2B:
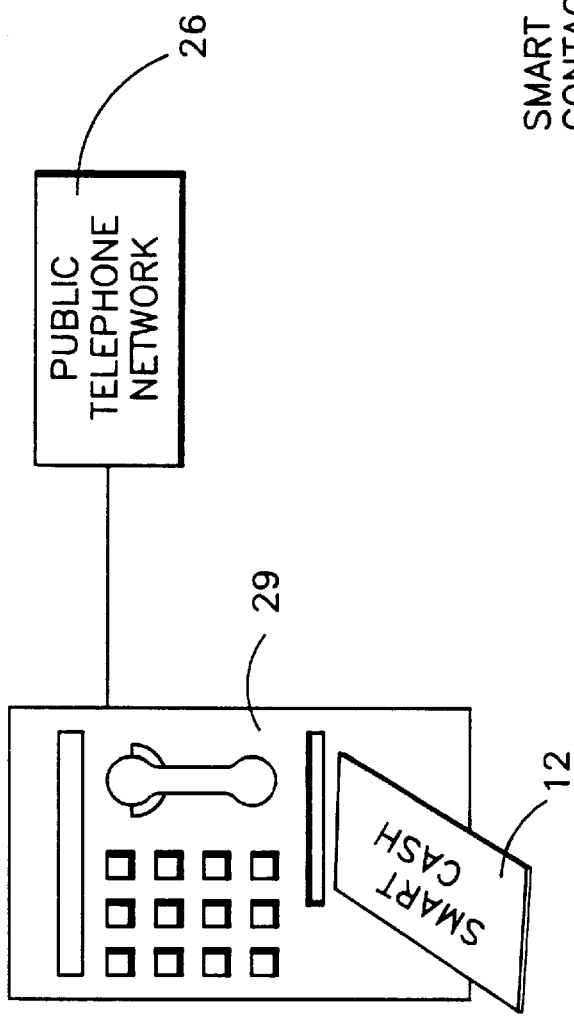

FIG. 1 illustrates the general elements of a card issuance system particularly useful in connection with this invention. For example U.S. Pat. Nos. 5,175,416, 4,810,862, and 4,968,873 discuss details of IC card issuance and those details are incorporated herein by reference as needed to illustrate this background aspect of this invention.

Generally, IC card issuance is done via a terminal 10 which includes or is interfaced to a smart card reader/writer device 11 into which a smart card 12 may be inserted. Smart card 12 in this case is one in which a plurality of tokens values can be recorded in a plurality of individual token memory locations with each token being associated with a particular service or transaction entity, such as an electronic cash token associated with Bank A 14, a frequent shopper token associated with a frequent shopper service 15, and a phone usage token associated with a phone company 16. Smart card 12 may also have secure account memory locations which enable it to function as one or both of a credit card and debit card.

Terminal 10 is interfaced to a host computer system 13 which has transaction data links to each of the service entities described. The cardholder may elect to have the smart card issued to him loaded with one or more of the available tokens. Loading with a cash token and loading with a phone usage token each involve a transaction with Bank A to debit the cardholders account with the value of the tokens loaded onto the card. In the case of the phone company, the value of the phone usage token is credited to the phone company's account at the same time that it is debited to the cardholder's account. The value of the cash token loaded into the card may be held in a special set aside account by the bank in a closed card system or may be transferred to a settlement or clearing facility in an open card system. This accounting aspect of card issuance is not material to this invention and will not be discussed in detail herein.

What is important to this invention is that the smart card on which these tokens are loaded is one of the type which is manufactured with multiple token memory locations which have the appropriate level of security and the smart card itself has security features such as message encryption/decryption and card to terminal authentication as well as programming to handle token revaluation in accordance with this invention. Multiple token or multiple account smart cards are disclosed for example in U.S. Pat. Nos. 4,656,342 and 4,736,094 and the descriptions are incorporated by reference as needed to show exemplary structures and functions of IC cards having multiple token storage capabilities.

A particular form of smart card which may be utilized in implementing this invention is the PCOS smart card described in PCOS Technical Specifications, Version 1.0, published by GemPlus Card International of Gemenos Cedex, France. This document is hereby incorporated by reference as needed to show exemplary structures and functions of an IC card.

Card Usage

For background information FIG. 2A illustrates typical prior art card usage at a point of transaction location. Point of transaction terminal 20 has the capability of performing on-line transactions of debit or credit type using a magnetic stripe card. It also has the capability of performing an off-line transaction of debit type using an electronic purse form of smart card 12.

For on-line transactions, terminal 20 has a magnetic stripe card reader 21 which may be used to read a magnetic stripe card 25. For such on-line transactions terminal 20 has a data communication link via the public phone network (or leased line) to a host computer 27 for credit authorization or debit transaction processing. The system of FIG. 2A also includes a smart card read/write module 22 which may also include a keypad to serve as a PIN entry module for entry of a personal identification number for authentication of the cardholder. If smart card 12 is loaded with a cash value token, it may be used to pay for a purchase of goods or services in an off-line transaction. The typical steps of such an off-line transaction are first for the terminal 20 and pin pad 22 to authenticate the cardholder by requesting entry of a PIN and validation of that PIN based on corresponding data stored in card 12. This prevents fraudulent use of card 12 by an unauthorized person.

Optionally, in some electronic purse applications, this PIN validation may be eliminated to speed the processing of the transaction. In this case, the electronic purse is treated the same as cash and the bearer is assumed to be the rightful possessor of the electronic purse. One example of a point of sale terminal dedicated to electronic purse debit operations without PIN entry is disclosed in a copending and commonly assigned Roberts et al. U.S. application Ser. No. 08/143,573, entitled "METHOD & APPARATUS FOR ELECTRONIC CASH TRANSACTIONS," filed on Oct. 26, 1993.

Another option is to require PIN entry for spending cash in the electronic purse only when the amount of the transaction exceeds a preselected floor limit.

Then terminal 20 and card 12 will authenticate each other via a mutual authentication process which checks both card and terminal authenticity and compatibility with each other. This mutual authentication prevents use of a fraudulently issued card to complete a transaction and also prevents use of an unauthorized terminal to withdraw or add value to card 12. Once the security authentications have been completed, terminal 20 and card 12 pass transaction messages back and forth which results in withdrawing of cash value from card 12 to be entered into the transaction item memory of terminal 20 and rewriting of a new cash value into card 12. These steps are well-known and need not be discussed in any more detail here.

Later, terminal 20 may call host computer 27 or host computer 13, or both, to settle the day's transactions using various payment card media. The advantage of the use of smart card 12 as a cash token vehicle and the equivalent of government issue paper scrip is the off-line nature of the transaction and the avoidance of actual cash handling and associated time consumed by making change, counting and reconciling the till, etc.

If smart card 12 has a frequent shopper token associated with the merchant with whom the transaction is being consummated, the transaction may also involve separate steps to validate the frequent shopper token and, if appropriate, to change the value of the frequent shopper token on card 12 based on the amount of the transaction. Depending on the nature of the frequent shopper program, the token value on card 12 may be used to award discounts on the current purchase or similar activity such as redeeming of an award based on accumulation of a certain level of points.

FIG. 2B shows that the same smart card 12 may be used in a public telephone paystation 29 if the smart card 12 is loaded with a phone usage token value. The same transaction steps may be involved in this type of usage. Alternatively, less secure transaction steps may be employed, such as assuming that the cardholder is an authorized bearer, to make the smart card 12 compatible with single mode smart cards for phone usage which only check the authenticity of the card for security purposes.

Revaluation at Private Location

Figure 3:
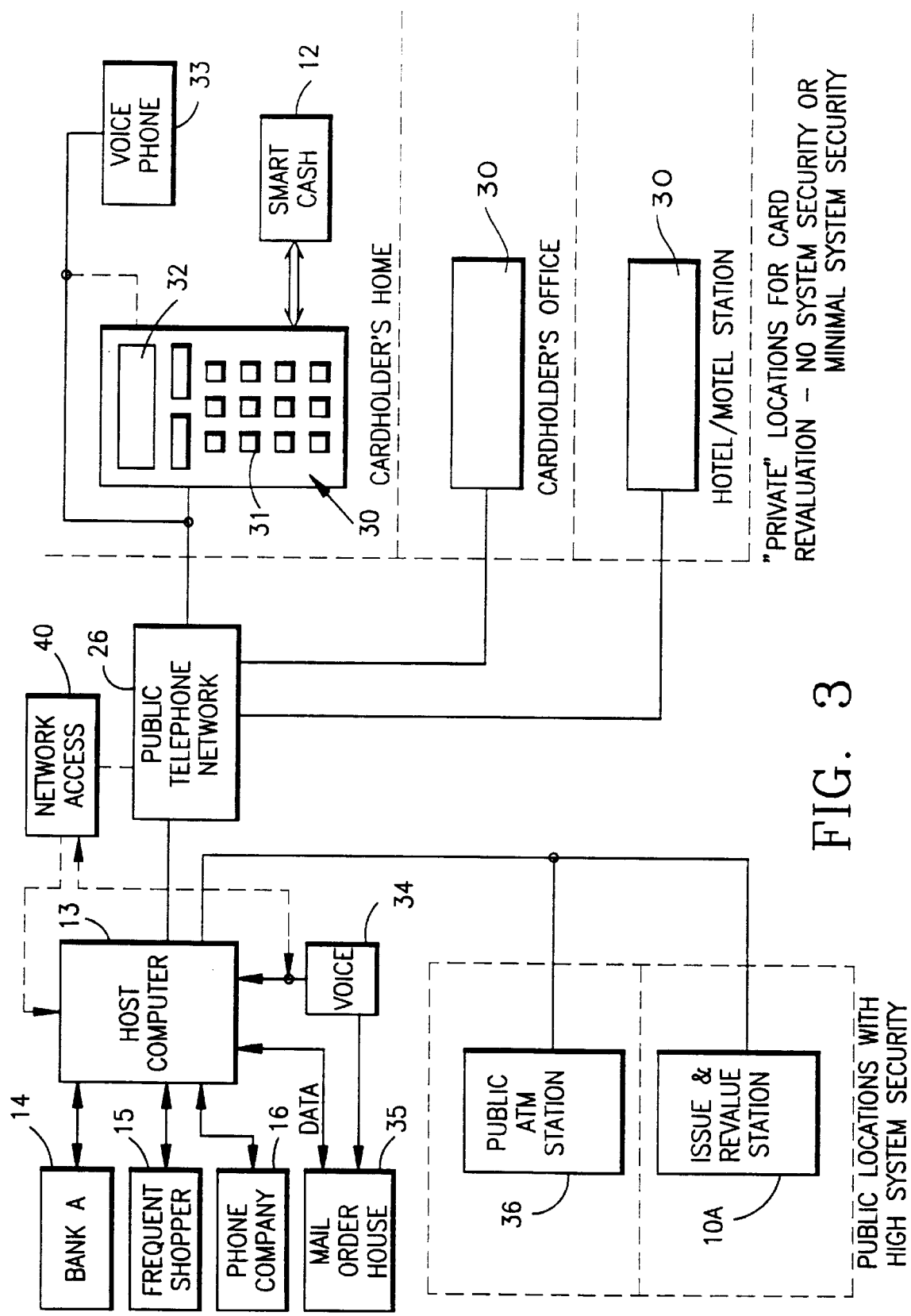
FIG. 3 is a basic system diagram of a private revalue and transaction system in accordance with this invention and useful in carrying out the method of this invention.

FIG. 3 illustrates the general principle of this invention of providing a method and apparatus for revaluation of cash token value smart card units at "private" locations using a terminal system with little or no security as opposed to revaluation at public locations where high system security, both physical and electronic, is applied.

Referring back to FIG. 1, it should be apparent that the hardware involved in card issuance must be maintained at a secure facility from both a hardware access and operations standpoint to avoid fraudulent or unauthorized activity. As shown in FIG. 3, smart card revaluation could be accomplished at a card issue and revaluation station 10A by including in the terminal whatever application software is required for card revaluation as well as issuance. The same equipment would be involved and the same security requirements would apply. Card-terminal authentication would be carried out between the card and the terminal. The cardholder might be required to enter his PIN secretly on a separate input device or trained trusted operators may enter the PIN and also do other cardholder authentication steps which may be in the bank's transaction protocol.

The same security steps would be carried out in any public ATM unit 36 which are set up for a smart card revaluation function except that the cardholder would be doing the transaction steps.

FIG. 3 also shows the use of a "private" terminal 30 for card revaluation. Private terminal 30 which may be located in a cardholder's home, office or other locations, such as hotel/motel front desks or concierge facilities. The general concept here is to use a simple terminal 30 which has a smart card data interface for communication with smart card 12 and a remote terminal data link, via modem or other data communication medium, to a remote terminal which may be a host computer 13 itself or a network access controller 40 and which is programmed for passing secure messages between IC card 12 and the remote terminal. By using the term "secure messages" is meant that the messages are rendered secure in the IC card and/or the remote terminal, rather than in the terminal 30, using encryption methods or other means. In essence, the terminal 30 provides a link between the IC card 12 and the remote terminal which is equivalent to the hard wired data path that exists between IC card 12 and the terminal in a secure card revalue station. Terminal 30 passes data and command messages between the two units and its operating system may be limited in intelligence to management of that simple function. Of course, more sophisticated functions may also be included to enable the terminal to handle other ATM or remote customer service functions which do not require the origination and receipt of secure messages after all secure message transmission and reception has been handled between IC card 12 and the remote terminal.

FIG. 3 also illustrates that the simple private revalue terminal 30 may be provided with hardware and intelligence to participate in simple phone-in mail order transactions with a mail order house 35. As an alternative to giving out a credit card number, which could result in fraudulent usage by an employee of the mail order company, or someone intercepting the information, the terminal 30 may be provided with the capability to switch temporarily from voice to data to perform an IC card debit function. However, the security functions are still carried out between the IC card and the remote terminal, probably a network access controller (NAC) 40 in this case, so that neither the private terminal 30 or a terminal at mail order house 35 need have the sophisticated security features. The network access controller is, in this case, programmed to carry out a simple debit transaction. It will send to the private terminal 30, the message and parameters needed to debit the amount of the cash transaction in the cash token of the IC card 12 and send another message to credit the transaction amount to the mail order house. That completed, the NAC 40 advises the parties, by electronic voice generated message or by a data display message that the electronic transaction is complete. Depending on programming, NAC 40 may then terminate the phone linkup or return the parties to voice communication for sign-off.

It should be apparent that this IC card revaluation function and order transaction function could also be incorporated into home terminal devices that are provided with additional intelligent functions to operate in a home shopping or home transaction network environment. For example, this revaluation function could be carried out in a smart screen phone programmed to perform the same functions as the personal terminal 30.

Preferably, IC card stores all of the information needed for the terminal 30 to initiate the remote terminal data link without interaction with the cardholder. This would include host phone number data and bank account data, if required. Alternatively, the IC card identification number could be directly linked to a single account or group of accounts.

It is also preferable that the phone number which is called by terminal 30 be one which is dedicated to the private terminal IC card revaluation function to avoid the requirement that personal terminal 30 send a special log-on message to indicate what type of transaction is being requested. However, the use of a general host phone number with a log-on provided by the personal terminal 30 is also within the general principles of this invention. It will be apparent that once secure account and cardholder identification (PIN) messages have been passed between IC card 12 and the remote terminal (host 13 or NAC 40), additional ATM or customer service inquiry transactions can take place between terminal 30 and the host computer. The intelligence for such functions can be placed solely in the host computer with simple display and keyboard I/O command interpreter in private terminal 30.

Alternatively, intelligence can be shared between the host computer and private terminal 30. For example, private terminal 30 may be programmed to enable the user to send transaction initiating messages or data inquiries to the host computer, based on dedicated function keys or menu selection via scrolling displays or other means.

It should now be apparent that a private terminal 30 of this invention may be widely distributed in people's homes, offices, and in other locations without risking compromise of the security of either the IC card or the remote terminal. Moreover, each cardholder has the advantage of being able to use any private terminal 30 to perform revaluation of a cash token in the IC card.

System Examples

Figure 4:
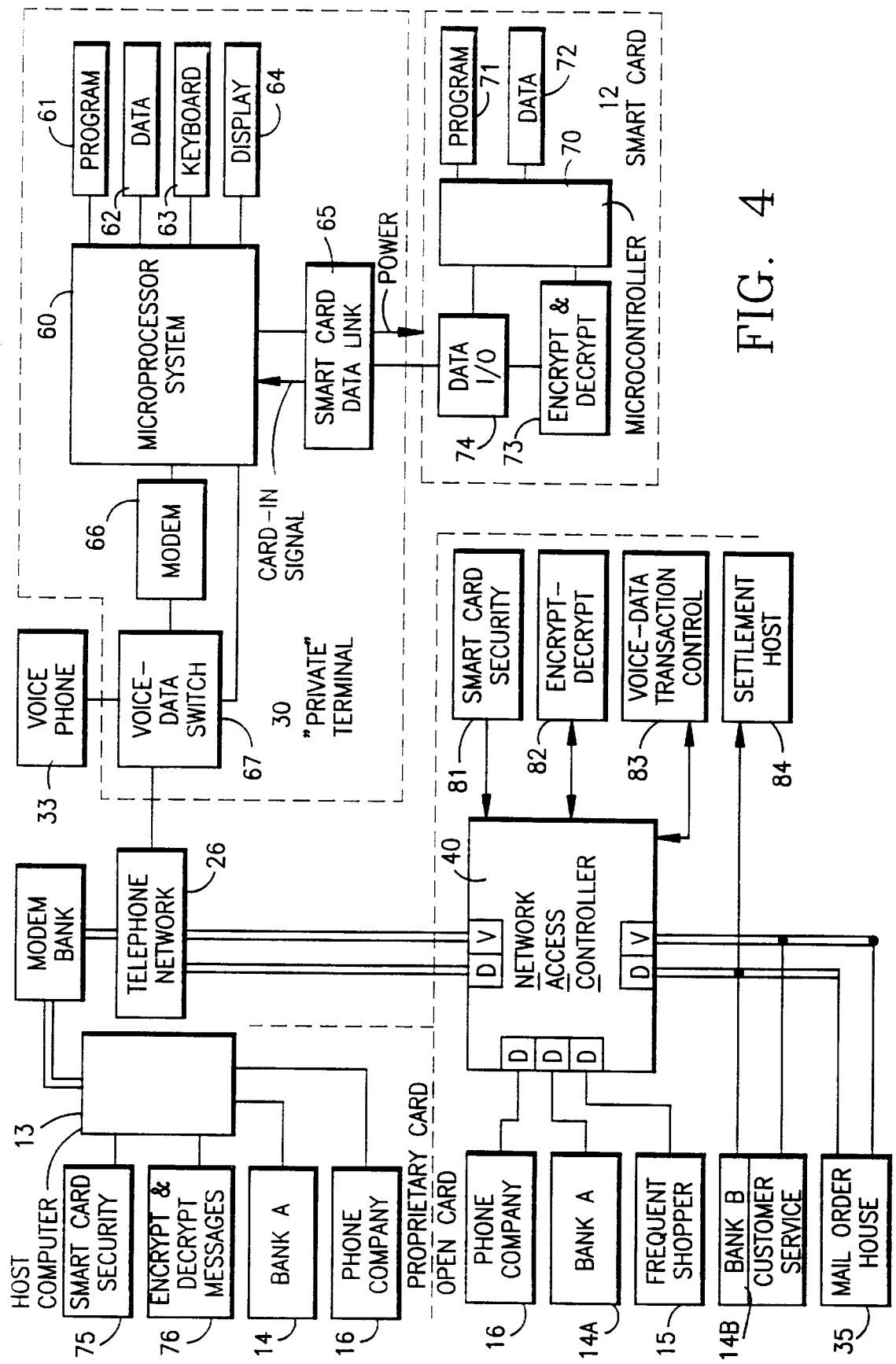
FIG. 4 is a block diagram illustrating the components and modules of a system in accordance with this invention and for carrying out the method of this invention.

FIG. 4 illustrates in block schematic diagram form the modules that would typically be employed in assembling a private terminal revaluation system in accordance with this invention and one that can carry out the method of this invention.

Private terminal 30 has a microprocessor system 60 with associated program memory 61 and data memory 62 together with input/output devices such as keyboard 63, display 64, modem 66, and smart card data link 65. A voice-data switch 67 may also be included if combined voice-data transactions for banking service and/or mail order are provided by the system. Smart card data link 65 provides data communication services to smart card 12 and may also be involved in providing DC operating power to smart card 12. Smart card 12 has an internal microcontroller 70 with onboard and/or auxiliary program and data memory 71 and 72. Data communication is handled by data I/O 74 together with an encrypt/decrypt module 73. This encrypt/decrypt module 73 may be hardware or software.

On the host side, in a proprietary card system, host computer 13 has a smart card security module which controls the generation of secure authentication and transaction messages and functions with an encrypt/decrypt module 76 that is compatible with similar functions in smart card 12.

In an open card system NAC 40 has a smart card security module 81 and encrypt/decrypt module 82. A voice data transaction control 83 provides for operation of the voice and data interfaces of the NAC in connection with BANK B which uses voice for customer service and a main order house 35 which accepts electronic cash from smart card 12 in settlement of voice originated purchases.

Figure 5:
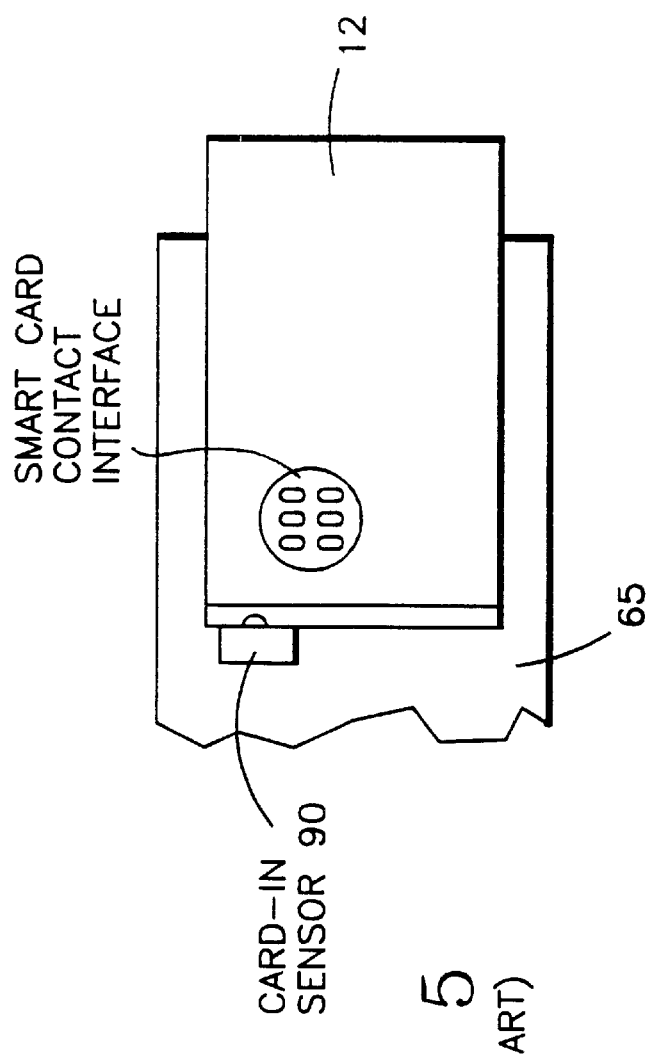
FIG. 5 illustrates a portion of a smart card data link structure useful in accordance with this invention.

FIG. 5 illustrates a prior art portion of smart card data link device 65 in the form of an IC card reader/writer interface unit which a card-in sensor 90 to sense when smart card 12 is fully inserted into the card receiving cavity of the reader and the contacts to the card are made so that power can be applied to the card.

Read Balance—Add Cash Program and Associated Smart Card and Host Program Steps

Figure 6A:
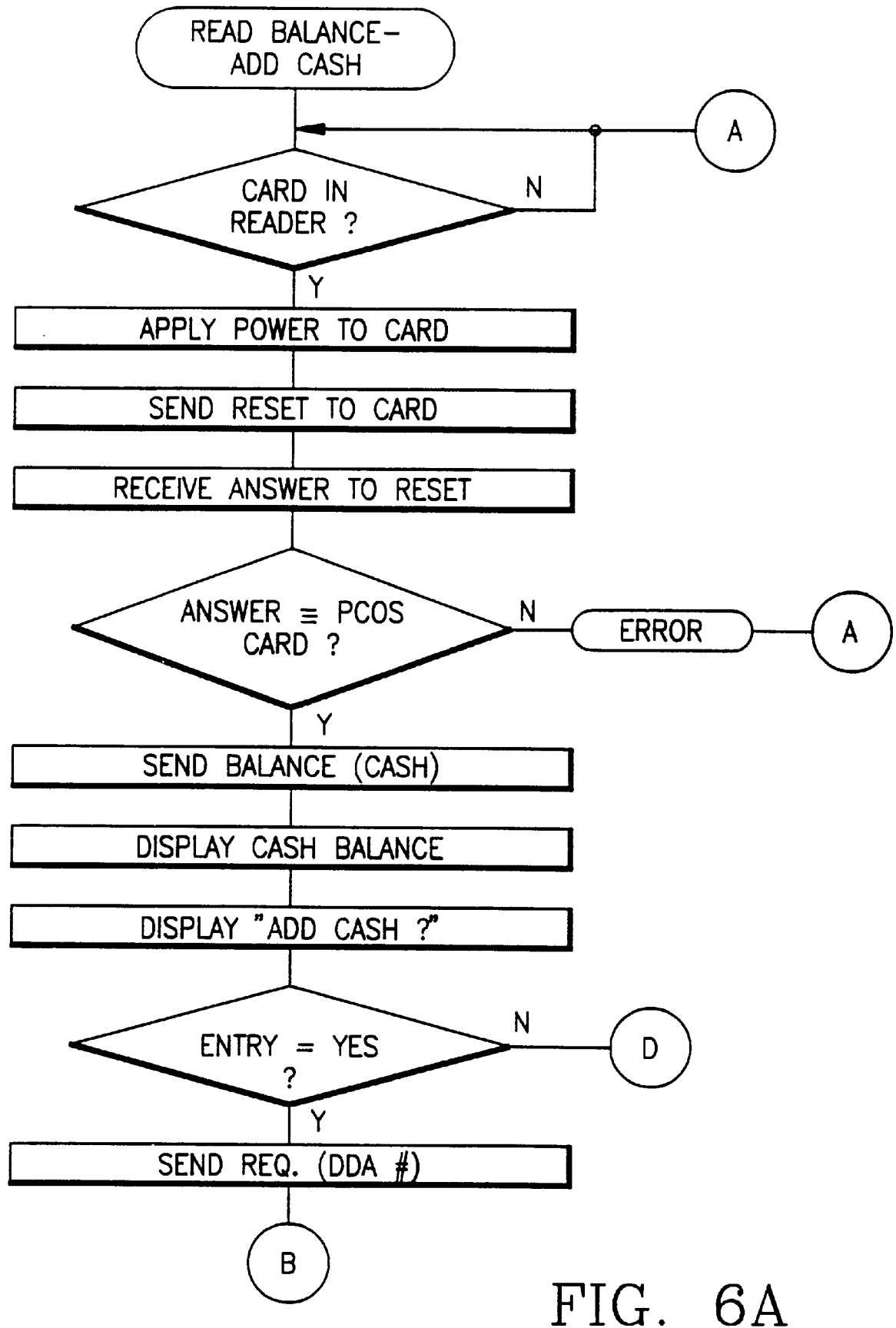
FIGS. 6A–6C are flow charts which illustrate method steps carried in a private terminal in accordance with this invention.
Figure 6B:
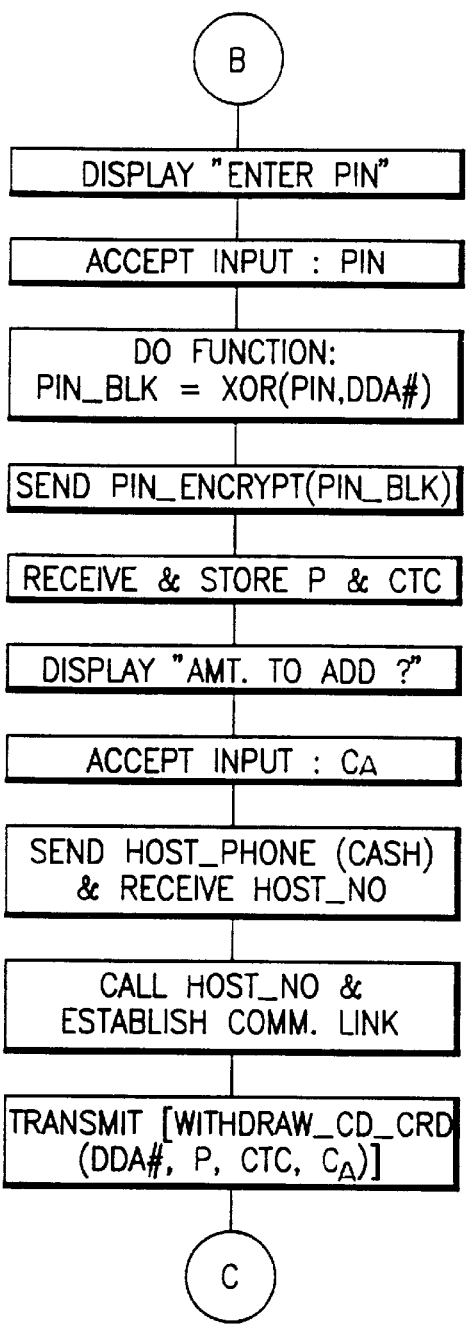
Figure 6C:
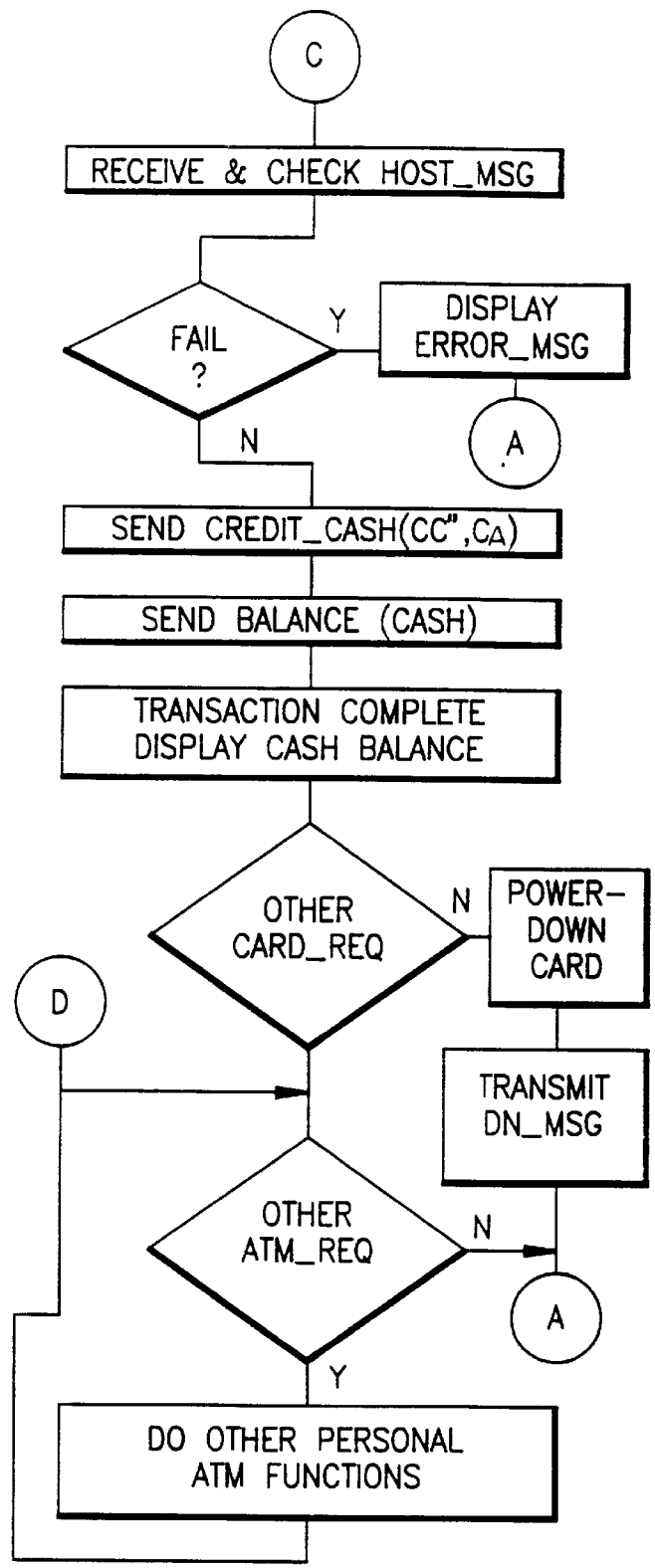

FIGS. 6A–6C illustrate the steps of a program named "READ BALANCE-ADD CASH" running in private terminal 30. The main steps of this program are for the purpose of adding cash credit to the cash token in smart card 12. For the purpose of this explanation, it will be assumed that the IC card is one that performs according to the electronic purse specifications of the PCOS smart card as set forth in "PCOS Technical Specifications" published by GemPlus Card International, Gemenos Cedex, France. This PCOS specification describes the prior art approach of using a terminal to perform encryption of the PIN entered by the user and also to perform encryption of a credit cryptogram received from the host computer. In accordance with this invention, the terminal has no encryption security program and all encryption operations are carried out in the smart card 12 and the host computer. The terminal may, as shown in FIG. 6B and described below, do an XOR function operation to set up for a PIN encryption operation by smart card 12. Alternatively, code could be added to smart card 12 to do the entire PIN encryption operation.

The first step of this program module checks for the presence of a car in the reader 65 and loops until a card in is sensed. When this checking step returns YES, the routine applies power to smart card 12 and sends a reset command to the IC card. The card returns an answer to the private terminal 30 which identifies the type of card. The next step is to check if the answer received indicates that the IC card is a PCOS card. If this checking step returns NO, and error is declared and appropriate error message displayed on the display of the private terminal 30. If YES is returned, a BALANCE(CASH) command is sent to the smart card. The smart card responds by doing a simple look up of the value stored in the cash token memory location of the card and returns that value to private terminal 30 over the communication link between the two devices.

It should be understood that each command sent to smart card 12 is followed by a GetResponse command. Also, according to good software practice, a response time-out function (not shown) and a response validation function (not shown) are included after the issuance of each GetResponse command. The response time-out function involves first starting a timer, and then sequentially checking to see if a response has been received or the timer has expired. If the timer expires before a response has been received, then an error is declared.

If a response is returned before time-out, then the validity of the response is checked in a separate checking step. If the response is not valid, an appropriate error is declared. In describing the steps of the example program, the hardware and software of private terminal 30 and smart card 12 will be assumed to be working properly so timer and validity checking steps will be satisfied.

Next the Cash Balance received from smart card 12 is displayed on display 64. This is followed by, or accompanied by, a display of an "ADD CASH?" menu item. Preferably private terminal 30 has at least two soft function keys for YES and NO responses to menu displays. Alternatively, special YES and NO shared or dedicated function keys can be included on the keyboard.

It should be understood that, at various places in the program flow shown in FIGS. 6A–6C, steps (not shown) may be included to detect whether smart card 12 has been removed before a timeout has occurred. This delays further program execution to allow the user to withdraw the card if no further activity is desired. One place where this might usefully be included is after the Cash Balance is displayed. If the user is just checking the card balance, the card may be withdrawn as soon as the balance is displayed. If the card is withdrawn, then execution returns to the beginning of the program to await entry of another card. As is well-known in the art, private terminal 30 will include a routine to sense card removal is in process and do card power down steps before actual communication with the card contact structure is lost. In other words, the card-in switch senses card removal before terminal to card contact is severed so that power down steps can be performed before physical contact breaking occurs.

Note that this cash balance reading and display steps are performed without any security steps and happen automatically on card entry. This enables the cardholder to check the cash balance on his smart card by simply inserting it into private terminal 30. This operation is almost as fast as opening a wallet to see how much cash money is in it and is a major benefit of providing a private terminal 30 in accordance with this invention.

The next step checks the response entered by the user. If YES is not entered, the program jumps to point D in FIG. 6C which will to determine if other private terminal 30 functions are to be invoked by the user. Assuming that the user wants to credit more cash to smart card 12, the checking step will return YES and private terminal 30 will send a command to smart card 12 to request its DDA#.

The next step is to display "ENTER PIN" followed by accepting keyboard input of a PIN code number by the user. This is followed by performing a functional manipulation of the entered PIN: PIN_BLK=XOR(PIN, DDA#). By performing this function in private terminal 30, encryption code already provided in a PCOS smart card can be utilized to complete a PIN encryption operation that will be compatible with PIN validation code in a host computer set up to do cash credit operations.

The next step is to send a command to smart card 12 to perform a PIN encryption on the value of PIN_BLK. Smart card 12 responds by performing the program steps shown in FIG. 7A. The PIN_BLK parameter is received and then a series of functions are performed. CTC (the Card Terminal Counter) is incremented, followed by an encryption step to set the authentication session key Ksa equal to the result of encrypting CTC using the authentication key called Kauth. This is followed by an encryption step to set the encrypted PIN value P equal the result of encrypting the PIN_BLK parameter using the session key Ksa. The values of P and CTC are then returned by smart card 12 to private terminal 30.

The next step performed in private terminal 30 is to receive and store the values of P and CTC so they can be included in a message packet to a host computer. This is followed by displaying to the user a prompting message: "AMT. TO ADD?" Next an input value Ca is accepted as the amount of cash to add to the cash token in smart card 12. It should be understood that the selection of the amount of cash to add could be performed in a number or ways. Like some ATM machines, the private terminal 30 could suggest a 'quick cash' amount, like $40.00. The private terminal 30 could track the users habits of adding cash amounts and suggest the typical amount that the user selects. This step should be understood as encompassing a broad range of amount selection sub-processes.

After the amount to add Ca has been entered and received, private terminal 30 sends a command to the smart card 12 to obtain the phone number of the host computer to call to perform the cash withdrawal and card credit operation. This involves a direct read of a memory location or file in smart card 12 which is known by the terminal to store the host phone number. It should be understood that there may be other tokens in the card and other host computers phone numbers might be linked to those tokens. For example, a shopping bonus token might have the phone number of the host computer to call to spend the bonus.

After the private terminal 30 receives the host phone number, it dials the number and establishes a communication link with the host computer. This may be done by modem over public phone lines or by cellular modem or any other data communication media. When the link to the host computer is established, private terminal 30 transmits a WITHDRAWAL_CD_CRD packet to tell the host the type of transaction and the parameters involved, e.g. DDA#, P, CTC, and Ca, in this case.

Figure 8:
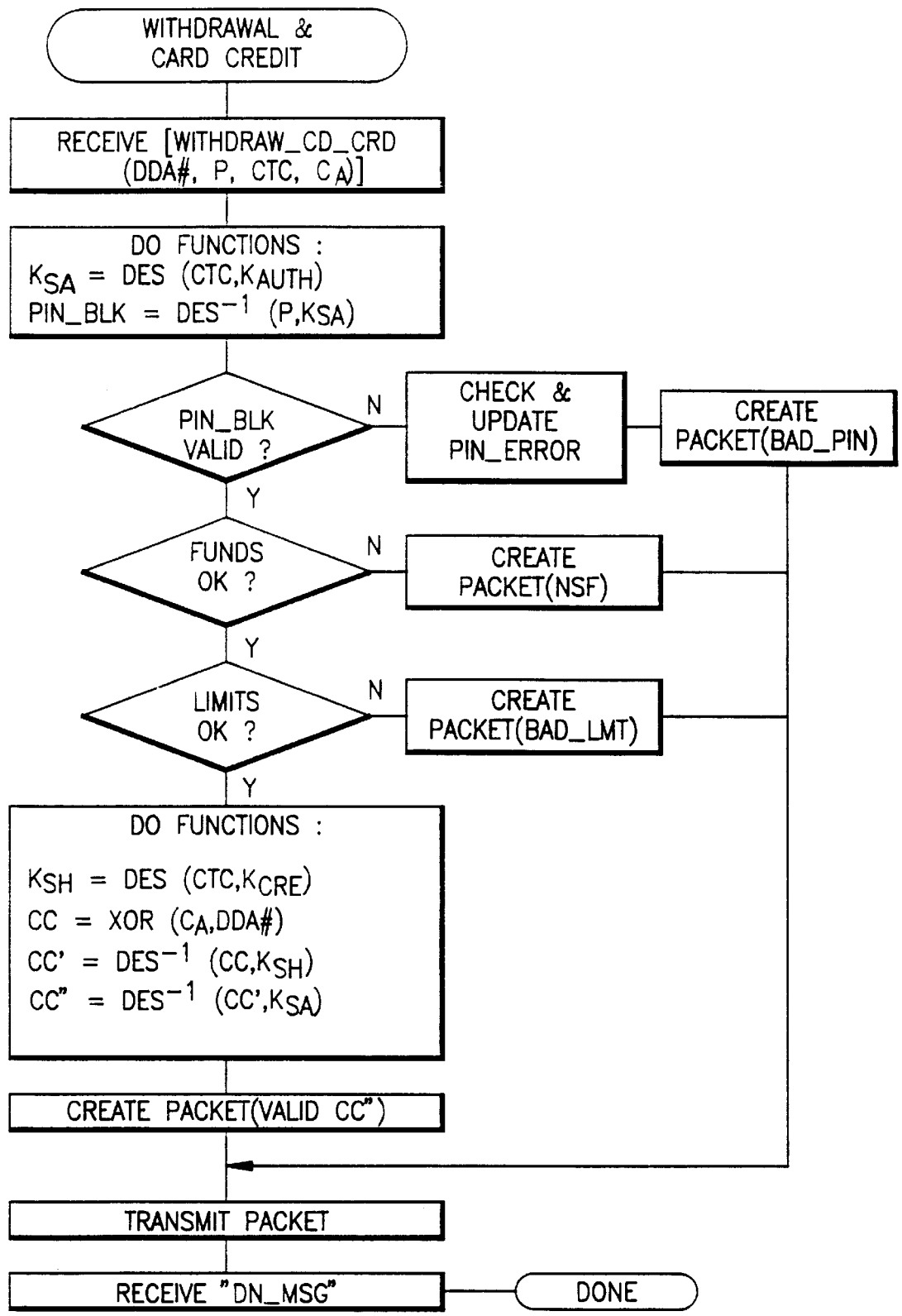
FIG. 8 is a flow chart illustrating method steps carried out in a host computer in accordance with this invention.

Typical steps performed by the host computer in response to this message packet are shown in FIG. 8. After the host receives the WITHDRAWAL_CD_CRD message packet, it derives the authentication session key Ksa by performing DES encryption on the received CTC parameter using the authentication key Kauth. The PIN_BLK is derived by DES decryption of the P parameter using the derived session key. These are standard encryption/decryption activities for session security and need not be explained in detail here. If PIN_BLK is valid, this means that the host computer has validated the PIN entered and authenticated smart card 12 as having used an appropriate authentication key Kauth in encrypting PIN_BLK.

Following the performance of these functions, the host computer runs a series of checking steps to see if PIN_BLK is valid, to determine if there are sufficient funds in the account, and to determine if transaction limit parameters are exceeded, e.g. a daily withdrawal limit. If any of these checking steps returns NO, an appropriate error packet is created to send back to private terminal 30. If a PIN entry error is involved, the PIN_ERROR count may be updated so the host computer can determine if the user has tried too many times to access the account with an invalid PIN entry.

If the checking steps all return YES, then host computer performs a series of functions. The host session key Ksh is derived by performing DES encryption on CTC using the credit key Kcre. Then the credit cryptogram CC is computed by performing the function XOR(Ca, DDA#).

Then two sequential decryption steps are performed as shown in this function block. A CC' version of the credit cryptogram is created by decrypting CC using the host session key Ksh. A CC" version is then created by decrypting C' using the authentication session key Ksa. This CC" value is then transmitted by the host computer back to private terminal 30 as part of a VALID CC" acknowledgment packet and the host computer is DONE when a DN_MSG is received from private terminal 30. It should be understood that the private terminal 30 may be programmed to perform other private ATM functions while it has the host computer on line. If so, the host computer will perform other private banking transaction steps under command from private terminal 30 or in response to different transmitted data packets. Any such additional functions are not part of this invention.

Going back to FIG. 6C, private terminal 30 receives and checks the host message. If some sort of error message packet is received, private terminal 30 determines that the transaction has failed, displays an appropriate error message and returns to the initial program steps. Depending on the reason for failure, the user may try again.

Figures 7A, 7B:
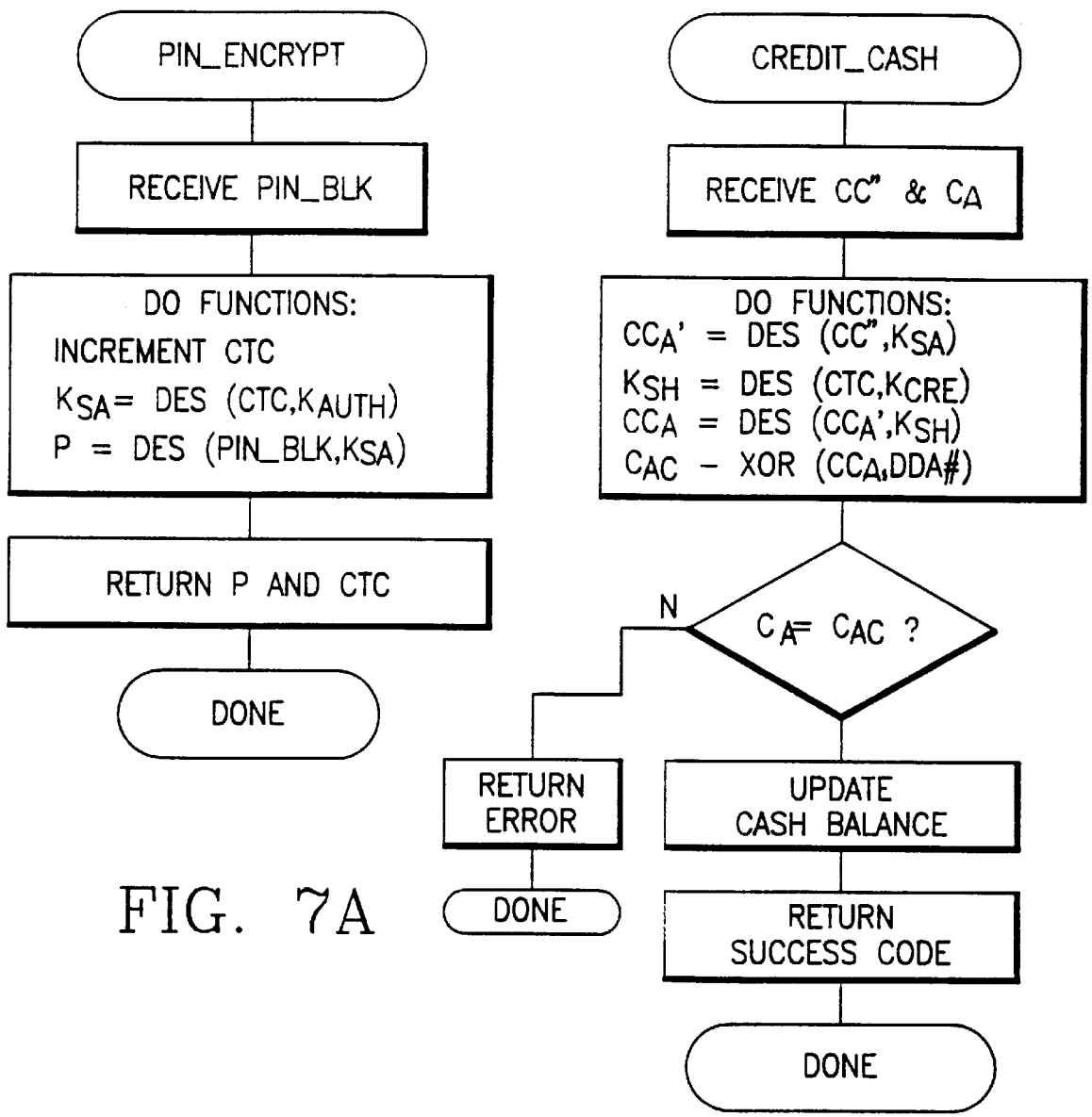
FIGS. 7A and 7B are flow charts which illustrate method steps carried out in a smart card in accordance with this invention.

Assuming the host message indicates that the transaction was successful, private terminal 30 send a CREDIT_CASH command to smart card 12 with the command parameters CC" and Ca). The smart card 12 processes this command by performing a CREDIT_CASH routine as shown in FIG. 7B. The command parameters are received and then a series of functions are carried out. First a parameter CCa' is derived by DES encryption of CC" using the authentication session key Ksa. Note, this is the inverse of the last encryption operation performed by the host computer as shown in FIG. 8. Then the host session key Ksh is created by DES encryption of CTC using the credit key Kcre. This mimics one of the functions done in the host computer. Next the parameter CCa is derived by DES encryption of CCa' using the host session key Ksh. Finally, Cac is derived by performing the XOR function on CCa and DDA#.

Next smart card 12 checks to see if Cac is equal to Ca as it will be if all of the encryption and decryption operations in smart card 12 match the corresponding operation in the host computer. If a match is not found, then an error is returned to private terminal 30. If a match is found, then the cash balance in the cash token is updated by incrementing it by the value of Ca. Then a success code is returned to private terminal 30.

Back to FIG. 6C, assuming private terminal 30 receives a valid response from smart card 12 after the CREDIT_CASH command is issued and executed in the card, a BALANCE(CASH) command is again issued and the cash balance again displayed along with a TRANSACTION COMPLETE message so the user can verify that the new balance includes the additional cash requested.

The program then checks to see if other card requests are desired by the user. If not, the card is powered down and a DN_MSG is transmitted to the host computer and the program returns to the beginning. If other card requests are not indicated, the program checks to see if other ATM requests are indicated by the user. If such other requests are indicated, these Personal ATM functions are carried out by private terminal 30 until the user is finished with all transactions. The additional Personal ATM functions are not a part of this invention and thus are not discussed herein. They might involve bill payments, account transfers, and the like carried out by the private terminal 30 from a remote location in a manner that mimics an ATM machine at a bank location.

It should be apparent from the above description that the private terminal 30 in accordance with this invention can be a simple and inexpensive device since it is carrying out simple data entry and data communication tasks with the smart card 12 and a host computer. The absence of security functions within the terminal makes it inexpensive to manufacture since security precautions are not required to protect against fraud.

It should also be understood that many variations on this example program shown and discussed could be implemented. For example, the program running in private terminal 30 could include a command to smart card 12 to validate the PIN entered before proceeding with other steps. This would preclude going through all of the steps of setting up a connection to a host computer only to discover that an error in PIN entry had been made. In such a modification, smart card 12 would include a module to check the PIN and to give the user a certain number of tries to insert the correct PIN before locking the card against further use.

The general principles of the system and method of this invention have been illustrated by descriptions of various embodiments. It should be understood, however, that persons of skill in this art could make numerous modifications without departing from the scope of this invention as claimed in the following claims.

What is claimed is:

1. A private terminal for carrying out at a private location a transaction consisting of alteration of a token value stored in an IC card issued to a cardholder, this token value altering transaction being carried out by using said private terminal and said IC card at said private location and also employing an operatively compatible terminal to carry out certain functions at a remote location, said IC card having a microcontroller and associated microcontroller program memory, security protected memory locations for token value data and card security data, a data communication interface, and prearranged card security programs stored in said program memory for managing security of cardholder access and security of terminal access to security protected memory locations for transaction related data reading and writing operations;

said operatively compatible terminal at said remote location including a data communication interface and prearranged transaction security programs compatible with said prearranged card security programs;

said private terminal comprising:

means for establishing a card data link to said data communication interface in said IC card;

means responsive to said cardholder initiating a token change transaction on said private terminal for establishing a terminal data link to said operatively compatible terminal at said remote location;

means for enabling said cardholder to initiate said token value change transaction including means for accepting cardholder entry of a token change vector;

means for accepting cardholder entry of a security data item and for communicating a representation of said security data item to said IC card via said card data link to enable said card security programs to prepare and return cardholder and card authentication data items;

means for communicating prearranged messages between said IC card and said operatively compatible terminal at said remote location via said card data link and said terminal data link including secure authentication messages to enable said IC card and said operatively compatible terminal to execute respective terminal authentication and IC card authentication programs; and secure transaction messages, including said token change vector, and cardholder authentication data to enable said operatively compatible terminal to verify cardholder identity and to enable said IC card and said operatively compatible terminal to execute a secure token value change transaction; and means operative after said IC card and said operatively compatible terminal have succeeded in executing said secure token value change transaction for reading a revised token value stored in said IC card via said card data link and for communicating said revised token value to said cardholder.

2. The terminal of claim 1 further comprising means for reading a current token value stored in said IC card immediately after said card data link is established; and means for communicating said current token value to said cardholder.

3. The terminal of claim 1, wherein said token value stored in said IC card is an electronic cash token; and said terminal is adapted for carrying out at said private location a cardholder purchase transaction initiated via a voice telephone call to a delivery service business having an associated operatively compatible terminal, and said means responsive to cardholder initiating a token change transaction includes means from for switching between a voice phone link and a terminal data link.

4. The terminal of claim 1, wherein said IC card includes security protected memory locations for a plurality of token value data items each associated with one of a plurality of service providers and a prearranged token value initialization program stored in said program memory which is compatible with a corresponding prearranged token value initialization program included in said operatively compatible terminal at said remote location;

and said terminal further comprises:

means for accepting cardholder entry of a token initiate request and an associated token change vector; and wherein said means for communicating a series of secure messages includes communicating secure transaction messages, including said a token initiate request and said associated token change vector, required by said token value initialization programs in said IC card and said remote terminal.

5. A method for carrying out, at a private location, an alteration of a token value stored in an IC card issued to a cardholder via an on-line transaction session utilizing said IC card, a private terminal at said private location, and an operatively compatible terminal at a remote location, said IC card having a microcontroller and associated microcontroller program memory, security protected memory locations for token value data and card security data, a data communication interface, and prearranged card security programs stored in said program memory for managing security of cardholder access and security of terminal access to security protected memory locations for transaction related data reading and writing operations, including token value reading and writing operations;

said operatively compatible terminal including prearranged transaction security programs compatible with said prearranged card security programs;

said method comprising the steps of:

a. establishing a card data link between said private terminal and said data communication interface in said IC card;

b. accepting input of a cardholder data security item and token change vector data from said cardholder;

c. communicating a cardholder data security message, including said cardholder data security item, to said IC card via said card data link to enable said card security programs to produce secure cardholder identification data;

d. establishing a terminal data link between said private terminal and said operatively compatible terminal;

e. communicating secure transaction messages between said IC card and said external terminal via said card data link and said terminal data link, including said token change vector data from said cardholder and said secure cardholder identification data, to enable said IC card and said external terminal to perform mutual authentication functions and to execute a secure transaction comprising writing an altered token value into one of said security protected memory locations in said IC card;

f. reading said altered token value stored in said IC card via said card data link; and g. communicating said altered token value to said cardholder.

6. The method of claim 5, further comprising the steps of:

a.1. reading a current token value stored in said IC card immediately after said step a.; and a.2. communicating said current token value to said cardholder.

7. The method of claim 5, wherein said token value stored in said IC card is an electronic cash token and said method is adapted for carrying out at said private location a cardholder purchase transaction initiated via a voice telephone call to a delivery service business having an associated operatively compatible terminal, and wherein said step a. is carried out after said cardholder has communicated a voice purchase order to an operator associated with said delivery service business, and said step c. is carried out by said cardholder and said operator respectively switching from a voice phone link to a terminal data link to complete the balance of said method steps.

8. The method of claim 5, wherein said IC card includes security protected memory locations for a plurality of token value data items each associated with one of a plurality of service providers and a prearranged token value initialization program stored in said program memory which is compatible with a corresponding prearranged token value initialization program included in said operatively compatible terminal at said remote location; and wherein said step e. includes e.1. communicating to said IC card and said external terminal a token initiate request from said cardholder along with a token change vector containing the amount of initial token value requested by said cardholder; and e.2. communicating secure transaction data messages between said IC card and said external terminal via said card data link and said terminal data link as required for said respectively token value initialization programs in said IC card and said external terminal.

9. The method of claim 5, adapted for also carrying out at said private location a plurality of automated banking transactions, and wherein said IC card further includes security protected memory locations for a plurality of bank account data items, including one or more of savings, checking, credit, and loan account data items; and said operatively compatible terminal has secure data and program links to a host computer associated with said cardholder's bank, said step e. comprises communicating secure transaction messages between said IC card and said operatively compatible terminal via said card data link and said terminal data link, including transaction messages associated with one or more of a series of said token value alteration and said automated banking transactions as selected by said cardholder.

* * * * *